United States Patent
Huebler et al.

(10) Patent No.: US 6,630,632 B2
(45) Date of Patent: Oct. 7, 2003

(54) METHOD AND ARRANGEMENT FOR THE CONTROL OF A DYNAMIC SCALE

(75) Inventors: Uwe Huebler, Neuenhagen (DE); Ralf Kubatzki, Berlin (DE); Wolfgang Thiel, Berlin (DE)

(73) Assignee: Francotyp-Postalia AG & Co. KG, Birkenwerder (DE)

(*) Notice: Subject to any disclaimer, the term of this patent is extended or adjusted under 35 U.S.C. 154(b) by 242 days.

(21) Appl. No.: 09/760,264

(22) Filed: Jan. 12, 2001

(65) Prior Publication Data

US 2001/0015291 A1 Aug. 23, 2001

(30) Foreign Application Priority Data

Jan. 14, 2000 (DE) .......................... 100 02 886
Jan. 14, 2000 (DE) ...................... 200 01 150 V

(51) Int. Cl.$^7$ ............................................ G01G 19/413
(52) U.S. Cl. .................... 177/4; 177/25.15; 705/407
(58) Field of Search ........................ 177/4, 25.15, 119, 177/120, 121, 122, 123, 145; 705/407, 414, 415

(56) References Cited

U.S. PATENT DOCUMENTS

| | | | |
|---|---|---|---|
| 4,753,432 A | 6/1988 | Freeman | 271/35 |
| 4,778,018 A | 10/1988 | Cordery et al. | 177/210 FP |
| 4,956,782 A | 9/1990 | Freeman et al. | 177/4 |
| 5,014,797 A | 5/1991 | Dolan et al. | 177/4 |
| 5,230,391 A | * 7/1993 | Murata et al. | 177/145 |
| 5,880,747 A | 3/1999 | Bartenwerfer et al. | 347/4 |
| 6,353,192 B1 | 3/2002 | Thiel | 177/25.15 |
| 6,472,616 B2 | * 10/2002 | Thiel | 177/25.15 |
| 6,559,391 B2 | * 5/2003 | Huebler et al. | 177/25.15 |

FOREIGN PATENT DOCUMENTS

| | | |
|---|---|---|
| DE | OS 198 33 767 | 1/2000 |
| DE | OS 198 60 296 | 9/2000 |
| EP | 0 514 107 | 11/1992 |
| EP | 1 014 050 | 6/2000 |
| GB | 2 235 656 | 3/1991 |

* cited by examiner

Primary Examiner—Randy Gibson
(74) Attorney, Agent, or Firm—Schiff Hardin & Waite

(57) ABSTRACT

In a dynamic scale, and a method for controlling a dynamic scale, an item to be weighed is transported by a transport device to a weighing cell. The transport device is operable in a number of different operating modes. At the weighing cell, a measured weight value is obtained, and this measured weight value is subsequently interpreted and, based on the interpretation of the measured weight value, the transport device is switched to a different operating mode, which may include reversing the direction of the transport device so as to permit the item to be re-weighed and subsequently discharged from the scale.

18 Claims, 6 Drawing Sheets

METHOD AND ARRANGEMENT FOR THE CONTROL OF A DYNAMIC SCALE

BACKGROUND OF THE INVENTION

1. Field of the Invention

The present invention is directed to a method and arrangement for the control of a dynamic scale system, referred to below as a dynamic scale, for weighing items during the transport thereof to a processing station, such as in a mail processing system.

2. Description of the Prior Art

"Mixed mail" means an unsorted stack of postal items that, with respect to a side to be printed. The item letters is used below as representative of all other possible pieces of mail that differ in format, thickness and weight. Methods and arrangements are suited for users of mail processing systems both with a dynamic scale and postage-calculating postage meter machine as well as with dynamic postage-calculating scales and franking devices.

In a known, automatic mail processor Francopost 12000 marketed by Francotyp-Postalia AG & Co., a dynamic weighing station is arranged following a separating station. The letters applied as a stack are first automatically separated and are then accepted by the dynamic weighing station, and their weight is determined. The weight determination ensues with a precision that enables the allocation of the letters to the correct postage class. The postage is automatically transmitted to the connected franking unit, and is debited and printed onto the letter. When the letter arrives on the weighing pan and during the transport thereof, mechanical oscillations, having an amplitude dependent on the letter weight, the transport direction and speed, the distribution of the letter mass as well as the letter stiffness, are transmitted onto the weight sensor. The unwanted oscillations limit the precision of the measured result. Generally, a measuring precision of ±1 g is indicated in dynamic letter scales up to a letter weight of 1000 g. Given transport of heavy pieces of mail having a weight above 1000 g, the transience of the dynamic scale requires more waiting time as a consequence of the vibratory influences on the weighing system. All letters that are even heavier are usually separately weighed with a suitable static scale. The corresponding weight or postage then can be manually entered into the franking unit. The automatic execution is thus interrupted. Especially disadvantageous is the fact that the mail handler cannot predict whether a specific letter that is introduced in the a stack in common with the others will exceed this weight limit.

U.S. Pat. No. 4,778,018 discloses a dynamic letter scale wherein the weighing cell is resiliently suspended with respect to the transport mechanism. The transmission of oscillations from the transport mechanism onto the weighing cell thus is damped. For high weights, however, this damping is not sufficient in order to assure an adequate measuring precision. Moreover, such a resilient suspension produces a transient behavior of the weighing pan that lengthens the measuring time and thus reduces the letter throughput.

U.S. Pat. No. 5,014,797 discloses a non-modular device for automatic mail processing in which the dynamic weighing function is integrated. Shortening of the transport path and a letter throughput per time unit that is higher overall are intended to be achieved. In this solution, as well, however, the maximum weight is limited, given a predetermined measuring precision and processing speed. A product constructed according to this principle achieves a throughput of approximately 5000 an hour given a maximum weight of 500 g. For letters having a higher weight, the manufacturer offers an additional, static scale as an attachment. Thus, automatic processing of heavier letters is not possible.

U.S. Pat. No. 4,956,782 and British Specification 22 35 656 disclose a semi-dynamic weighing. The user station arranged upstream can be a scale and the user station arranged downstream is a postage meter machine. A continuously moving letter must be completely accepted by the scale for the measuring time required for the weight determination. The probability that the scale will determine an incorrect measured result is higher given mixed mail. The measuring time is increased dependent on the dimensions of the letter. A complicated control, which interprets the dimensions of the letter in advance, and control motors are required for this purpose. Alternatively, the weighing path could in fact be lengthened and a reject compartment could be provided. This, however, would increase the length of the overall mail processing system; which is not possible without extensive retrofitting.

According to European Application 514 107, a control means interrupts the transport given large letters and letters that are difficult to weigh until the measurement is stable. The measurement ensues in the static condition of the dynamic scale. A detector is arranged in the scale in the proximity of the downstream conveyor belt end, and only letters whose weight has been identified prior to this time pass through this detector. Measurement errors occur given a short weighing path and unevenly distributed mass in the letter or a high transport speed of high-mass letters. In the event of a sudden stoppage, moreover, the letter can slide from the weighing pan due to its mass inertia. The dimensions of the weighing pan are therefore designed somewhat larger or the transport speed is fixed lower. The throughput given mixed mail is correspondingly reduced.

German Published Patent 37 31 494 corresponding to U.S. Pat. No. 4,753,432 discloses weighing during a quiescent time, wherein the operation of the franking system and of the transport system are interrupted because the latter would otherwise produce an excessive vibration. The transport time from the weighing module to the postage meter machine is designed to be short. The speed cannot be arbitrarily increased, however, without increasing the risk of jams. The throughput performance that can be achieved is limited by pauses introduced into the executive sequence. The speed of the weighing is limited by the speed of the weight determination. This is particularly slowed for heavy letters, for which the measurement must be exact.

In contrast to semi-dynamic operation, dynamic operation is problematical for heavy letters. German OS 198 33 767 discloses a dynamic scale wherein the mass of the weighing pan is significantly decreased and its rigidity significantly enhanced. Short transient times for the overall measuring system result therefrom, as, consequently, do correspondingly higher letter transport speeds given dynamic operation.

With the goal of assuring an efficient mixed mail processing with a dynamic scale in conjunction with a newly developed postage meter machine, whereby the former implements a weight determination and the latter implements the calculation of the postage value, this known dynamic scale has a weighing pan for the letters that is implemented in lightweight structure but which is flexurally and torsionally rigid. This weighing pan is coupled to a weighing cell at the approximate location of the center of gravity of the weighing pan and of a letter with the highest allowed weight that is arranged centrally on the weighing pan. Negative effects of the load arm are minimized by the aforementioned coupling of the weighing pan to the weighing cell. An increase in the range of utilization is established by the improvement of the function properties of the dynamic scale.

A method for the control of a dynamic scale that can process mixed postal matter having different size and thickness and that can be operated in at least two operating modes is disclosed in German Patent Application DE 19860296.0. In the dynamic operating mode, a piece of mail is supplied, before the beginning of a first measuring time span, with a transport speed that is set to a predetermined value and independently of the letter format when the letter is located at the entry to the dynamic scale. Speed regulation is deactivated by the controller of the dynamic scale during the dynamic weighing in the measuring time span, so that a weight measurement ensues given a deactivated speed regulation. An activation of the speed regulation for the motor ensues again when the letter is located in the discharge of the dynamic scale. The letter subsequently passes through the postage meter machine or further processing stations of the mail processing system.

The scale can be switched from a dynamic to a semi-dynamic operating mode. If the scale identifies an invalid measured result, a reverse motion of the incorrectly measured letter is triggered within the scale. The scale stops the conveyor belt during the following semi-dynamic weighing until the scale has determined a correct measured result. However, the clock performance (throughout of letters per hour) is reduced because the scale only works in the static or, respectively, semi-dynamic operating mode for letters that were initially incorrectly weighed or for other pieces of mail.

SUMMARY OF THE INVENTION

An object of the present invention is to achieve an automatic processing of mixed mail with mailing having higher weight as well in the dynamic operating mode of a scale in order to increase the throughput of pieces of mail per hour. An optimally high proportion of the mail of a mail shipper should be weighed in the dynamic mode, with manual interventions being as few as possible during the mail processing.

The above object is achieved in accordance with the invention in a dynamic scale, and a method for operating a dynamic scale, wherein items to be weighed are transported on a transport device to a weighing cell, at which a measured weight value is obtained, and wherein the scale is controlled to operate in one of a number of operating modes of the transport device dependent on the measured weight value, which may include, if necessary, re-weighing the item before the item exits the dynamic scale.

It has been found that a dynamic weighing in two directions, downstream as well as upstream, is fundamentally possible with the inventive measuring arrangement. The measuring arrangement of the dynamic scale is coupled to a conveyor for the continuous transport of letters. The conveyor is called a transport device below. The transport direction is reversible, and thus a letter transport can be implemented upstream in the direction of the system entry location as well as downstream to the further processing station.

The piece of mail—referred to below as letter—is transported downstream to the further processing station with a first speed, whereby a weight measurement ensues which is interpreted for plausibility of the measured result. Given non-plausibility, i.e. the measured result of the letter weight is declared invalid, and a dynamic re-measurement of the weight is implemented. For this purpose, the letter—by reversing the transport direction of the transport device—is transported with a second speed upstream into a predetermined position back to the letter entry.

During the return transport of the letter, the weight thereof is determined in a dynamic scale without an intermediate stop.

Given successful re-measurement for which the weighed result is plausible, the letter is carried downstream to the further processing station without further weighing. The discharge can ensue with a maximum speed prescribable for the dynamic scale, that is higher than the first and second speeds.

A further re-measurement can ensue when the measuring time is inadequate or when the re-measurement is not plausible. When reaching a predetermined position in the letter admission, the letter is transported downstream across the weighing system a second time with a third speed by again reversing the transport device, whereby the dynamic scale determines the weight of the letter with a further re-measurement during the transport. When the result of the re-measurement is plausible (valid), the letter is carried to the next processing station with the speed that is set for the system throughput without disturbing influences.

Another possible manner of operation of the invention is that, given a weighed value that is not plausible, the weighing system is left in the dynamic condition but no weight determination is implemented given return transport of the letter by reversing the transport direction of the transport devices in order to further damp the natural oscillations of the weighing system. A repetition of the weight determination of the letter during transport is implemented only when the letter has reached the predetermined position in the admission region and the transport of the letter downstream by the transport device has been resumed.

During the passage of the letter, sensors identify the letter in its respective positions. The implementation of the plausibility check is disclosed in German OS 198 60 296. The invention assures that a high proportion of the mail volume of the mail shipper ensues dynamically. Manual interventions are required only when other errors have occurred that have negatively influenced the oscillatory behavior of the weighing system such as, for example, impacts or improper handling of the system components.

It is of no significance for the realization of the invention whether the letters are transported horizontally or vertically. The invention is not limited to currently known weighing methods known. As stated above, the further processing station coupled to the scale receives weighed letters from the transport device of the dynamic scale. A control unit is connected to the weighing cell, the sensors and the transport device. The latter is fashioned for a bi-directional transport. The sensors identify the letter position in the transport path. The transport devices in the dynamic scale has a controllable drive, and the control unit includes a microprocessor that is connected to a program memory and to a non-volatile memory. The microprocessor is programmed such that the letter is transported upstream in the direction of the first processing station with a second speed or downstream in the direction of the further processing station with a second speed. Dependent on the result of the weight determination, the microprocessor switches from the first mode into a second operating mode. When the measured result is valid, the letter is discharged to a further processing device in the first operating mode. When the measurement is invalid, a switch is automatically made to a second operating mode. In the second operating mode, the letter is transported upstream in the direction of the first processing station with a second speed and is re-weighed, or given very poor vibratory behavior of the weighing system, is transported directly back to the predetermined position in the admission region without being weighed. The letter is dynamically re-weighed only after resumption of the transport direction of the letter downstream with a third speed. The microprocessor determines the respective magnitudes of the second and third speeds dependent on the extent to which the measuring arrangement with the weighing cell has already zeroed-in on the weight in the first operating mode.

It is provided that the second and third speeds are different in magnitude from, or the same as, the first speed but lower than a maximum speed with which a letter is carried downstream in the direction of the further processing station without weight determination.

DESCRIPTION OF THE PREFERRED EMBODIMENTS

Figure 1:
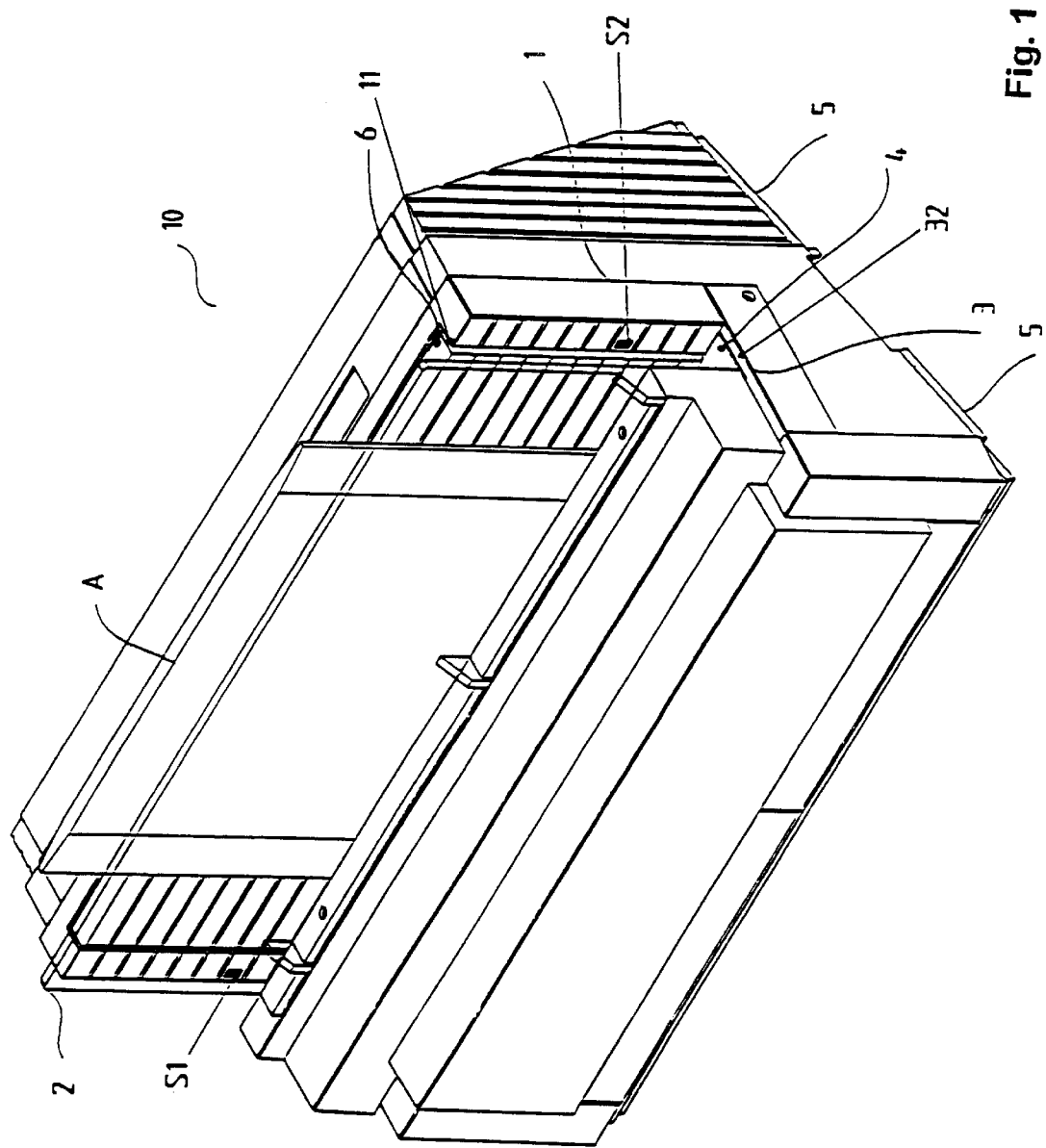
FIG. 1 is a perspective view of a dynamic scale from the front constructed and operating in accordance with the invention.

FIG. 1 shows a perspective view of a dynamic scale 10 that is fashioned for the transport of letters A standing on edge. The letters A individually in succession come to lie against a weighing pan 6 that is arranged in a recess 11 in a back guide wall 1 of the scale. Sensors S1 and S2 are arranged in the back guide wall 1 at both sides of the recess 11 for the weighing pan 6. Forked light or reflected light barriers that detect the trailing edge or the leading edge of a letter A when it is transported onto the weighing pan 6 are suitable as the sensors S1 and S2. The sensor S1 is arranged upstream close to the beginning of the path of the letter A on the weighing pan 6 (as viewed in the transport direction). A transport device 4 having a conveyor belt 41 (not visible) lies at the level of a lower guide wall 3 of the scale. The back guide wall 1 is inclined slightly toward the rear, preferably by 18° from the vertical. This corresponds to an optimization angle that has already been determined for an automatic letter feed and a postage meter machine (German OS 196 05 014 and German OS 196 05 015). The lower guide wall 3 is arranged orthogonally relative to the rear and, accordingly, relative to the front cover plate 2 as well. A defined letter attitude and a smooth adaptation to the preceding and following devices is thus achieved. All said assemblies or parts are secured on a chassis 5 with appropriate spacers. Further details regarding the structural design of the scale can be derived from German Patent Application 198 33 767.1, corresponding to U.S. application Ser. No. 09/364, 264, filed Jul. 15, 1999 ("Apparatus for Weighing Moving Postal Mafter," Huber et al.), the teachings of which are incorporated herein by reference.

Figure 2:
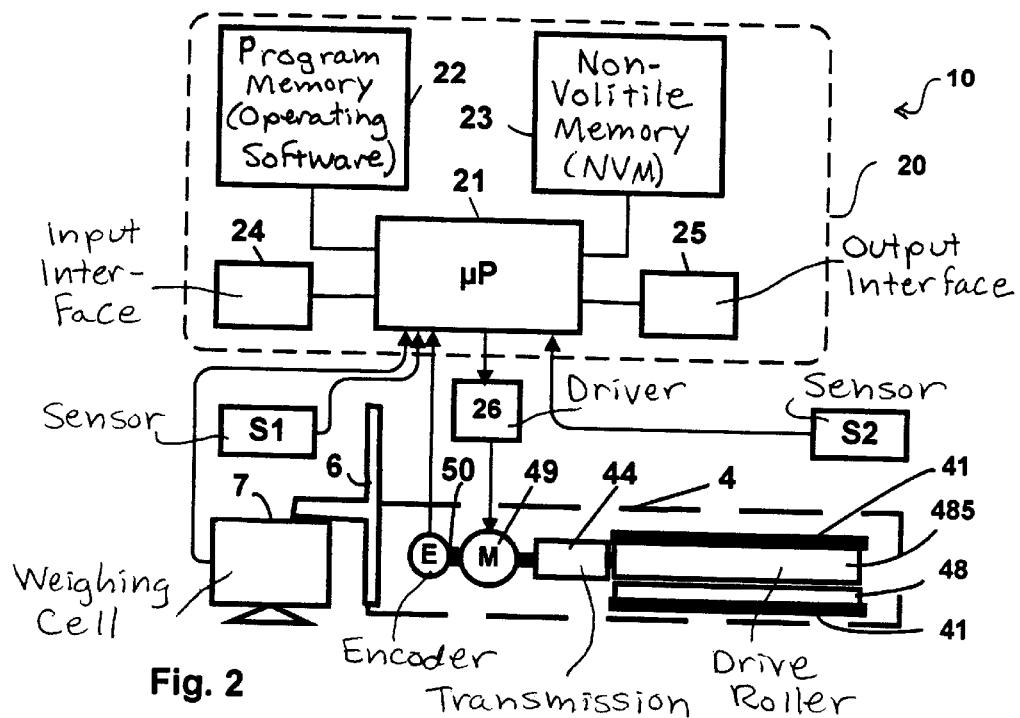
FIG. 2 is a block circuit diagram for the control of a dynamic scale constructed and operating in accordance with the invention.

The block circuit diagram for the control of a dynamic scale and the block circuit diagram of the control of a franking device are explained with reference to FIG. 2. The control unit 20 of a dynamic scale 10 has a microprocessor 21 that is connected to a program memory 22, a non-volatile memory 23 as well as to an input interface 24 and an output interface 25. An appertaining set of parameters for the evaluation of the measured values is stored in the non-volatile memory 23 respectively for different predetermined speeds. The microprocessor 21 has an internal main memory and, if necessary an additional, external main memory. Alternatively, a microcontroller with integrated memories can be utilized. The microprocessor 21 has an output operationally connected to a motor 49 of the transport device 4 of the dynamic scale 1 via a driver 26 and has an input operationally connected to an encoder 50, the sensors S1, S2 as well as to a weighing cell 7 in order to receive sensor signals, encoder signals and weight data and in order to send control commands to the transport device 4.

The motor 49 in the transport device 4 of the scale 10 is a variable-speed motor 49 with reversible rotational sense for setting the transport speed and for changing the transport direction. The transport device 4 preferably contains a dc motor that is supplied with dc pulses, whereby a specific speed is set on the basis of the ratio of pulse length to pulse pause. The motor 49 drives a drive roller 485. The latter can act on the letters A directly or indirectly, preferably via a conveyor belt 41 that can be tautened with a tensioning device 48.

In the first operating mode for the dynamic operation of the scale, the transport device 4 implements a forward motion of a letter A downstream within the scale with a specific, first speed that does not exceed the transport speed in the further processing station.

Corresponding control commands can be generated with the control unit 20 with which—in a second operating mode—a second speed is generated in order to retard (as needed) the transport speed in the scale to such an extent that adequate measuring time is available for a dynamic measurement. In the second operating mode for the dynamic operation of the scale, the transport device 4 implements a reverse motion of the letter A upstream within the scale 10 with the specific, second speed. The motor 49 supplied with dc pulses delivers a specific speed on the basis of the ratio of the pulse length to the pulse pause, as a result of which a specific speed is set on the conveyor belt 41. During the return transport upstream up to a predetermined position in the admission region, the letter A is dynamically weighed a second time. Dependent on the result of the first, implausible weight determination, the microprocessor 21 switches the speed of the reverse movement of the letter A. The magnitude of the transport speed is dependent on the extent to which the measuring arrangement with the weighing cell 7 has already zeroed in on the weight in the first measurement. After detection of the returned letter A by the sensor S1, the drive composed of a transmission 44 and motor 49 again reverses the transport direction. The drive is controlled by the microprocessor 21 by the transport speed for the discharge being set higher than the first speed or a third speed for a repetition of the weight determination. In a known way, the transport speed for the repeat measurement can be set decelerated. As a result, vibration influences caused by heavy letters and stochastic influences such as oscillatory impacts at the point of placement of the dynamic scale 10 are reduced. Given a successful weight determination, the letter A is conveyed to a further processing device, preferably to a postage meter machine, with a transport speed adapted to the mail processing. The motor 49 supplies a specific speed due to the ratio of pulse length to pulse pause, as a result of which a specific speed is set at the transport device.

In a further embodiment the transport device 4 of the scale 10 has a switchable drive and the controller 20 includes the driver 26 that is connected between the drive and the control circuit, as a result of which the transport direction of the scale can be reversed in order to transport the letter back to the start of the weighing dish 6 in the second operating mode and in order to implement a re-weighing during the return transport. The driver 26 can be fashioned as a relay. The control signals from the control unit 20 drive the relay, which switches the voltage for the drive motor of the transport device. The motor 49 is connected to the drive roller 485 via a suitable transmission 44 which can be either a gearwheel or a belt.

In an alternative embodiment, the transport device 4 of the scale is a motor with switchable transmission that can be switched into different speeds and rotational senses.

The weight determination ensues in the first operating mode during the measuring time span wherein the letter A is transported downstream in the direction of the further processing station with a first speed. In the measuring time span, measured values are sorted according to size and a measured value lying in the middle is determined. An identified measured value is declared valid as a result of the weight determination as long as predetermined limit values and shutoff criteria are not transgressed. Further details about the weight determination in the scale can be derived from German Application 198 60 294.4, corresponding to co-pending U.S. application Ser. No. 09/458,000 filed Dec. 10, 1999 ("Method and Arrangement for Determining a Weight with a Dynamic Scale," Hubler), the teachings of which are incorporated herein by reference.

The transgression of the shutoff criteria is a measure of the extent to which the measuring arrangement with the weighing cell has already zeroed in on the weight in the first operating mode. If the measuring arrangement with the weighing cell has not adequately homed in on the weight in the first operating mode, then the letter A is transported back upstream in the second operating mode with a second speed that is lower than the first speed. If the measuring arrangement with the weighing cell has in fact zeroed in on the weight in the first operating mode, but the check result is implausible, then the letter is transported back upstream in the second operating mode with a second speed that can be greater than or equal to the first speed. When the letter weight is plausibly determined, the letter A is stopped at a predetermined position in the admission area and transported to the postage meter machine with a maximum speed adapted to the dynamic scale (10). If the weight value is implausible, the letter A is weighed again during transport downstream to the postage meter machine with a speed equal to or lower than the first speed.

Figure 3:
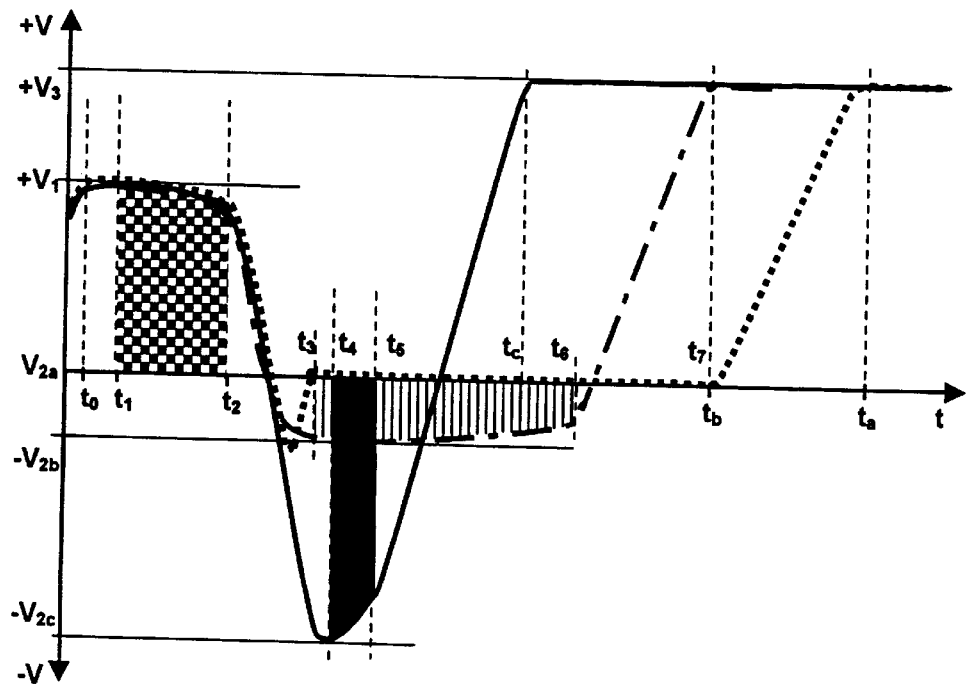
FIG. 3 is a speed/time diagram for the control of the upstream re-weighing in dynamic scale constructed and operating in accordance with the invention.

FIG. 3 shows a speed/time diagram for the control of the dynamic scale when a re-weighing is required after the weighing. The scale is in the first operating mode when a letter A is supplied at time $t_0$ with a (positive) transport velocity $V_1$. The measurement (checkerboard pattern) begins with time $t_1$ and ends at time $t_2$. At time $t_1$, input jolts on the weighing dish 6 given letter feed has usually already decayed. A re-weighing is required when the input jolts on the weighing pan 6 given letter feed have not yet decayed or not decayed far enough. Such a requirement is recognized in the interpretation of the measured values. It is usually high-mass letters that shoot at least partially beyond the back end of te scale at the letter output. The transport velocity $V_1$ is therefore reduced to the velocity $V_{2a}=0$, and the letter is then transported back upstream (negative velocity), at least until the sensor S2 detects that the leading edge of the letter in turn leaves the letter output 32. The transport velocity is then reduced again to the velocity $V_{2a}=0$. The dotted line shown in FIG. 3 shows a static re-weighing beginning with time $t_3$ and ending at time $t_7$. A static re-weighing in the second operating mode can also be derived from the aforementioned co-pending application Ser. No. 09/458,000 and shall not be explained in further detail herein.

Inventively, a dynamic re-weighing can ensue in a second operating mode when the letter is transported back upstream to the admission area with a second (negative) velocity and is weighed. The dynamic re-weighing is shown as a line pattern area and begins with time $t_3$ and ends at time $t_6$, whereby the second velocity $V_{2b}$ is lower in amount than the first velocity $V_1$ of the first operating mode. The letter is handed over at time $t_b$. The dynamic re-weighing is shown as a black area and begins with time $t_4$ and ends at time $t_5$, whereby the second velocity $V_{2c}$ is greater in amount than the first velocity $V_1$ of the first operating mode. The letter is handed over to a postage meter machine at time $t_c$, with $t_c<t_b<t_a$.

In another embodiment, a renewed dynamic re-weighing ensues after the letter A is first transported back to the admission area up to a predetermined position with a second (negative) velocity, with an adequate distance from the predetermined position in the direction of the next processing device in order to again repeat a weight determination of the letter A in the dynamic mode of the dynamic scale 10, if it was not possible to determine a plausible weight value with the measurement during forward transport.

After recognition of the letter position on the basis of the letter edge of the letter A, the sensor S1 in the admission region emits a corresponding signal to the control unit 20, the effect thereof being that the motor 49 is driven with reversed rotational sense and the letter A is carried downstream to the next processing device with maximum speed when a plausible weight value was identified, or with a speed lower than or equal to the first speed when no plausible weight value is present after the first weight determination.

In a further embodiment that the controller 20 conducts the re-measurement with a higher transport velocity dependent on the extent to which the weighing cell has already zeroed in on the weight of the letter A.

Figure 4A:
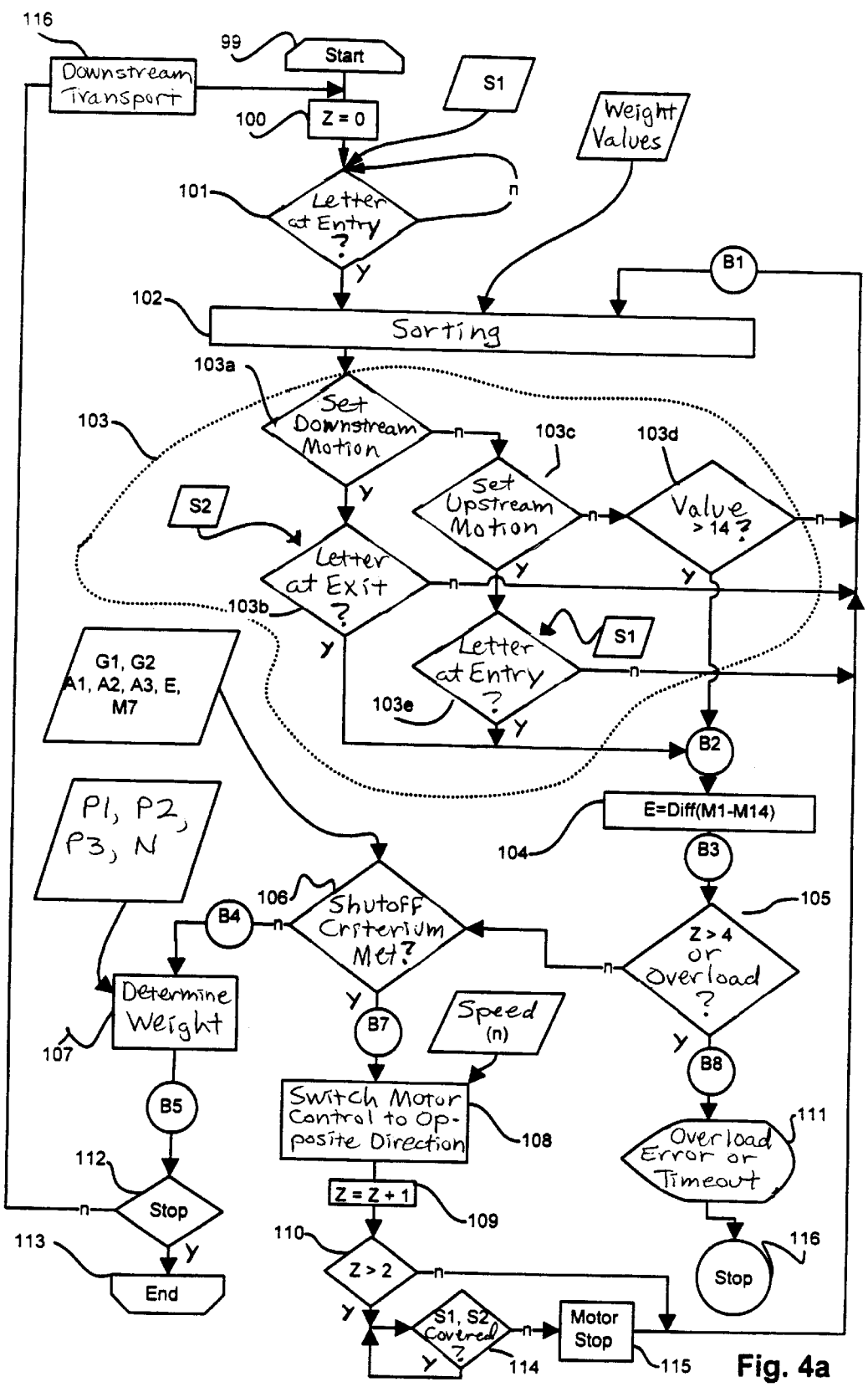
FIG. 4a is a flowchart for the control of the upstream re-weighing in the dynamic scale constructed and operating in accordance with the invention.

FIG. 4a shows the flowchart for the control of the dynamic scale. The microprocessor 21 can identify the leading edge of the letter A with the sensor S1 at the letter admission and starts the executive sequence (in step 99). First, a loop counter is set to Z=0 in step 100. Measured weighing values are constantly supplied by the weighing cell 7 for the purpose of weight determination. The microprocessor 21 has recognized (in step 101) the trailing edge of the letter A with the sensor S1 at the letter admission, and starts (point B1) the sub-program of sorting (in step 102) the measured weighing values M1, M2, M3, . . . , M7, . . . , Mx, . . . M14 as described in the aforementioned co-pending application Ser. No. 09/458,000. A predetermined plurality of, for example, P3=14 last measured values M1 through M14 can be prescribed with a parameter P3. A branch is made from the step 102 to a sub-step 103a of the evaluation step 103. When the forward (downstream) motion direction is set, a branch is made to a sub-step 103b. After a time lapse when the letter A is transported downstream, the microprocessor recognizes the leading edge of the letter A (in step 103b) with the sensor S2 at the letter output 32 and branches to a step 104. The time span that has passed from the reference point B1 for an acquisition of the predetermined number of last measured values is referred to as measuring time span T1. The microprocessor 21 now forms a decision parameter E in step 104 as difference value between the highest and lowest sorted value.

If the leading edge of the letter A was not yet detected at the output in the sub-step 103b, then a branch is made back to a reference point B1 at the input of the sorting step.

When the movement is set to zero or reverse (upstream), a branch is made from the sub-step 103a to a sub-step 103c of the evaluation step 103. Given a movement reduced to zero, a branch is made from the sub-step 103c to the sub-step 103d of the evaluation step 103 and a semi-dynamic weighing is implemented. Otherwise, a dynamic weighing is implemented during the travel in reverse and a branch is made to the sub-step 103e of the evaluation step 103. If the leading edge of the letter A at the output (in sub-step 103b) or the trailing edge of the letter at the admission (in sub-step 103e) has not yet been detected, then a branch is made to a reference point B1 at the input of the sorting step 102. Otherwise, i.e. after the acquisition of the measured weighing values M1 through Mx or M1 through Mi>M14—whose number is again prescribed by the parameter P3—a reference point B2 is reached. The decision parameter E can now again be formed in the step 104 as a difference value between the highest and lowest sorted value. Subsequently, a reference point B3 is reached, and the microprocessor 21 now starts the inquiry for at least one overload in the step 105. In terms of size, for example, the measured value M7 lies in the middle between the highest and the lowest values and is compared to the highest overload limit G3. Additionally, the loop counter is interrogated for time out after Z>4. The point B8 is reached when a criterion is met, i.e. overload or Z>4. If an overload error or timeout exists, it is interpreted further (in step 111) and the scale is stopped. If no overload or timeout is present, then a determination is made in a further query step 106 as to whether the value is valid or invalid. To this end, a sub-program is called, this being explained in detail on the basis of FIG. 5. The difference value E from the first M1 and the fourteenth sorted measured value M14 should lie within the weight range of one of the shutoff criteria A1, A2 or A3. For example, it lies within a range defined by the second shutoff criterion A2 and thus yields valid measured values. The shutoff criterion A1 applies to lightweight letters, the shutoff criterion A2 applies to medium-weight letters and the shutoff criterion A3 applies to heavy letters. When the check of the transgression of the limit values and shutoff criteria has yielded the validity of the measure value M7 lying in the middle, this means that none of the shutoff criteria has been met (reference point B4). Since none of the shutoff criteria has been met, a branch can now be made onto the step 107 for determining the weighing value, a subprogram being called and processed therein (reference point B5). Given a successful weight determination in the step 107, the letter eject ensues in a sub-step 116, as does the handover of the weighing result to the postage meter machine. The motor 49 or the transmission 44 is also set to the forward motion direction (downstream). The subprogram can likewise be derived from the aforementioned co-pending application Ser. No. 09/458,000. When the scale is not stopped (for example, manually), this being interrogated in step 112, then a branch is made from step 112 back onto the step 100. Given an identified stop command, the end of operation of the scale is reached (step 113).

Otherwise, given invalid measured values, i.e. when the check of the transgression of the shutoff criteria in step 106 indicates that at least one shutoff criterion is met or exceeded, then reference point B7 is reached, and a branch is made to the step 108, causing the motor control 20, 26, 44, 49 to be switched, in this case to initiate the return transport of the letter A into a weighing position and to then implement a re-weighing during return travel.

Dependent on whether the check in step 106 yielded a transgression of the shutoff criteria A1, A2 or A3, the microprocessor selects and enters a reference value n1, n2, n3 for speed control before switching into the second operating mode (reference point B7). The current speed n is identified by the encoder 50 and employed for the speed regulation in the step 108. The speed regulation (not shown) is shut off (disenabled) in the actual measuring interval for the re-weighing mode. From step 108, a return branch is then made via the steps 109 and 110 onto the reference point B1 to the sorting step 102, and a branch is then made via the query steps 103a, 103c, 103e to the step 104 for the difference formation in the re-weighing mode. The count value of the loop counter is incremented in the step 109, Z=Z+1.

The measurement evaluation begins with the branch to the reference point B1. Previously, the microprocessor 21 can have recognized with the sensor S2 that the leading edge of the letter A no longer covers the output 32 of the scale. The measured values Mx supplied by the weighing cell 7 are sorted and stored in the step 102. The measuring interval is retroactively defined for x measured values that are still stored from after the letter A reaching the admission region. In step 103e, the sensor S1 is thus used to evaluate whether the trailing edge of the letter A has arrived at the admission region. The admission region (not visible in FIG. 1) is at the opposite end of the scale from the output 32. If the trailing edge of the letter A has not yet arrived at the admission region, then a branch is made from the step 103e back onto the reference point B1 at the beginning of the step 102. When the trailing edge of the letter A has arrived at the admission region, then the reference point B2 at the beginning of the step 104 for the difference formation in the re-weighing mode is reached. After executing the query steps 105 and 106, the reference point B4 is reached if no transgression of the overload value or of the loop criterion (timeout) or of the shutoff criteria is found. Otherwise, when a transgression of the shutoff criteria is found, the reference point B7 is reached. The motor control now switches to the forward motion direction (downstream). After incrementation Z=Z+1 in the step 109, the microprocessor 21 finds in the following step 110 that the loop count Z>2 of the loop counter has been reached, and a check is made in the step 114 as to whether the sensors S1, S2 in the admission/output of the scale are still covered. When this is the case, there is a wait in a waiting loop until the letter A—as a result of the switching of the transport direction—no longer occupies the admission/output of the scale, i.e. is located only on the weighing pan 6. A motor stop (n=0) is then set in the step 115, and a third operating mode for a semi-dynamic weighing begins, whereby a direct branch is made to the reference point B1. The measurement ends after stop 112 with a plausible result or given stop 116 with an implausible result.

Figure 4B:
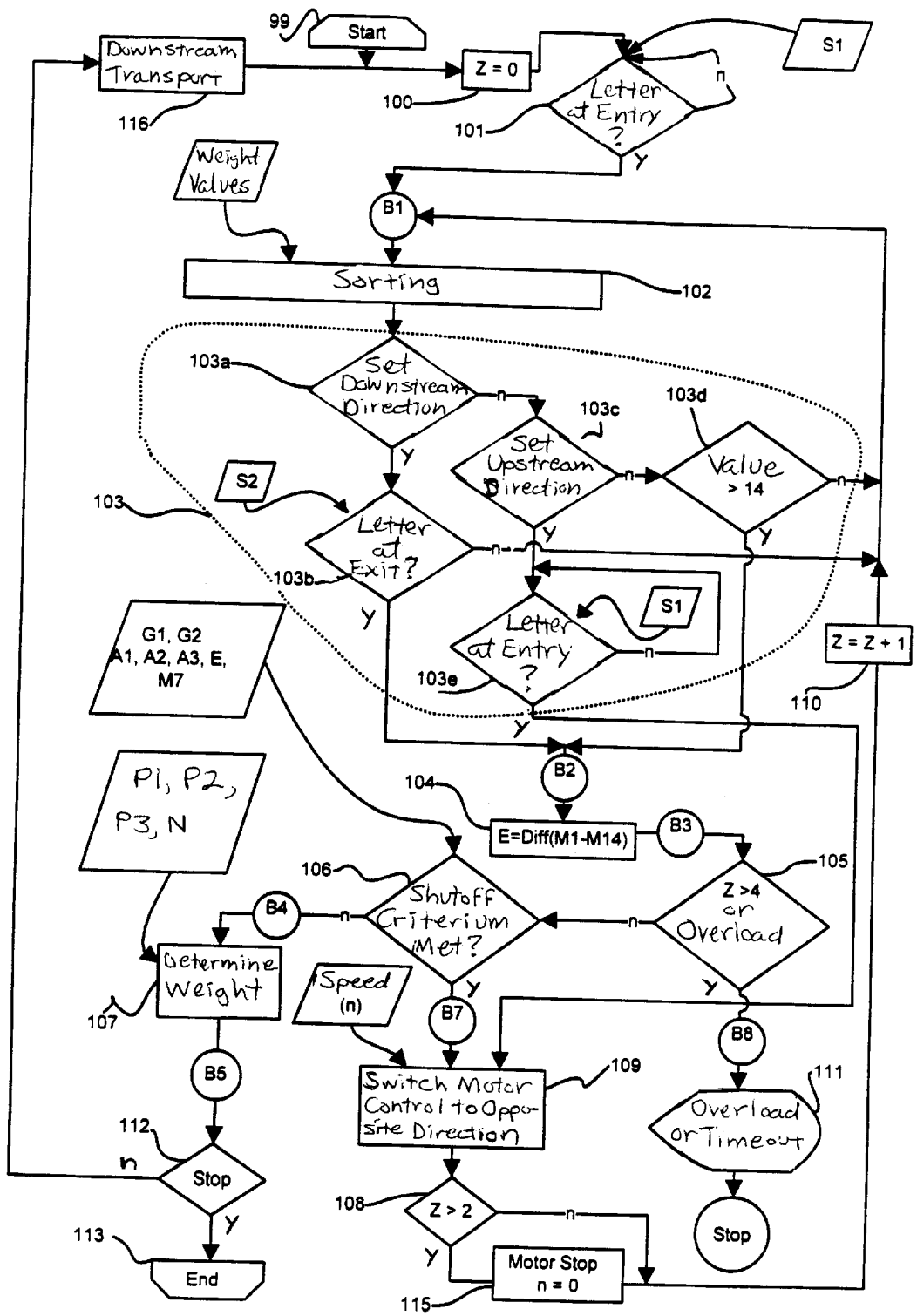
FIG. 4b is a flowchart for the control of the downstream re-weighing in the dynamic scale constructed and operating in accordance with the invention.

FIG. 4b shows the flowchart for the control of the dynamic scale for a second variant. The microprocessor 21 can detect the leading edge of the letter A at the letter admission region with the sensor S1 and starts the executive sequence (in step 99). First, a loop counter is set to Z=0 in step 100. Measured weighing values are constantly supplied by the weighing cell 7 for the purpose of weight determination. The microprocessor 21 recognizes (in step 101) the trailing edge of the letter A with the sensor S1 at the letter admission region, and starts (point B1) the sub-program of sorting (in step 102) the measured weighing values M1, M2, M3, ..., M7, ..., Mx, ... M14 that as described in the aforementioned co-pending application Ser. No. 09/458,000. A predetermined number of last measured values M1 through M14 can be prescribed with a parameter P3, for example, P3=14. A branch is made from the step 102 to a sub-step 103a of the evaluation step 103. When the forward (downstream) motion direction is set, a branch is made to a sub-step 103b. After a time lapse while the letter A is transported downstream, the microprocessor 21 recognizes the leading edge of the letter A (in step 103b) with the sensor S2 at the letter output 32 and branches to a step 104. The time span that has passed from the reference point B1 for an acquisition of the predetermined number of last measured values is referred to as measuring time span T1. After T1, the microprocessor 21 forms a decision parameter E in step 104 as a difference value between the highest and lowest sorted values. If the leading edge of the letter was not yet detected at the output in the sub-step 103b, then a branch is made back to a reference point B1 at the input of the sorting step.

When the movement is set to zero or reverse (upstream), a branch is made from the sub-step 103a to a sub-step 103c of the evaluation step 103. Given a movement reduced to zero, a branch is made from the sub-step 103c onto the sub-step 103d of the evaluation step 103 and a semi-dynamic weighing is implemented.

After the acquisition of the measured weighing values M1 through M14 or M1 with i≧14, whose number is prescribed by the parameter P3, a reference point B2 is reached and the decision parameter E is formed in the step 104 as a difference value between the highest and lowest sorted values. Subsequently, a reference point B3 is reached, and the microprocessor 21 now starts the inquiry for at least one overload in the step 105. In terms of magnitude, for example, the measured value M7 lies in the middle between the highest and the lowest values and is compared to the highest overload limit G3. Additionally, the loop counter is interrogated for transgression (timeout) after Z>4. The point B8 is reached when an overload criterion is met, i.e. Z>4. The existence of an overload error or time out is interpreted further (in step 111) and the scale is stopped. If no overload or timeout is present, then a determination is made in a further query step 106 as to whether the value is valid or invalid. To this end, a sub-program is called, as explained in detail in the aforementioned co-pending application Ser. No. 09/458,000.

The difference value E from the first M1 and the fourteenth sorted measured value M14 should lie within the weight range of one of the shutoff criteria A1, A2 or A3. For example, it lies within a range defined by the second shutoff criterion A2 and thus yields valid measured values. The shutoff criterion A1 applies to lightweight letters, the shutoff criterion A2 applies to medium-weight letters and the shutoff criterion A3 applies to heavy letters. If the check of the transgression of the limit values and shutoff criteria indicates the validity of the measure value M7 lying in the middle, this means that none of the shutoff criteria has met (reference point B4). Since none of the shutoff criteria were met, a branch can now be made to the step 107 for determining the weighing value, a sub-program being called and executed therein (reference point B5). Given a successful weight determination in the step 107, the letter eject ensues in a sub-step 116, as does the handover of the weighing result to the postage meter machine. The motor 49 or the transmission 44 is also set to the forward motion direction (downstream). The sub-program is also described in the aforementioned co-pending application Ser. No. 09/458,000. As long as the scale is not stopped (for example, manually), (which is interrogated in step 112), a branch is made from step 112 back to the step 100. Given an identified stop command, the end of operation of the scale is reached (step 113).

Otherwise, given invalid measured values, i.e. when the check of the transgression of the shutoff criteria in step 106 indicates that at least one shutoff criterion is exceeded, then reference point B7 is reached, and a branch is made to the step 108, whereat the motor control 20, 26, 44, 49 is switched, in this case to initiate the return transport of the letter A into a weighing position and to then implement a re-weighing later during forward travel. The microprocessor 21 selects and enters a reference value n2 for speed regulation upon return transport with a second velocity $V_2$ before switching into the second operating mode (reference point B7). The current speed n is identified by the encoder 50 and is employed for the speed regulation in the step 109. From the step 109, a branch is then made via the steps 108 and 110 back to the reference point B1 to the sorting step 102, and a branch is then made via the query steps 103a, 103c, 103e to the step 109 for switching the letter transport direction for the re-weighing mode. So that an adequate measuring path is available in the re-weighing, a reverse travel determined by the sub-steps 103a and 103c is previously carried out. There is a waiting loop, i.e. a branch is made onto the sub-step 103e of the evaluation step 103 as long as the trailing edge of the letter A has not yet been detected at the admission region of the scale with sensor S1 and microprocessor 21 in the sub-step 103e. When the trailing edge of the letter reaches the admission region of the scale, then a branch is made to a step 109 in order to in turn reverse the motion direction to "forward".

The speed regulation is also shut off in the actual measuring interval for the re-weighing mode. The count value of the loop counter was incremented in step 110, Z=Z+1, and now stands at Z=2. The measurement evaluation again begins with the branch to the reference point B1. Forward travel determined by the sub-steps 103a is thereby implemented.

The microprocessor 21 now drives the motor 49 with the same parameters (n1) as in the first pass. The loop counter, which is now set to Z=2, can be interrogated in the step 108 before the step 110 for incrementing the round counter, Z=Z+1=3, and, subsequently, the reference point B1 is reached. In the second loop, the dynamic weighing is repeated during the latter transport that ensues downstream. Consequently, the steps 102, 103 and 104 are executed. If the leading edge of the letter A has not yet been detected at the output 32 in the sub-step 103b, then a branch is made back to the reference point B1 at the input of the sorting step 102. Otherwise, the reference point B2 is reached when the microprocessor 21 recognizes with the sensor S2 that the leading edge of the letter A reaches or covers the output 32 of the scale.

The measured values Mx supplied by the weighing cell 7 are sorted and stored in the step 102. The measurement interval is retroactively defined for x measured values that are still stored after the output 32 is reached. The reference point B3 is reached after implementation of the step 104 for forming the difference in the re-weighing mode. After executing the query steps 105 and 106, the reference point B4 is reached if no transgression of the overload value or of the loop criterion (timeout) or of the shutoff criteria is found. Otherwise, if a transgression of the shutoff criteria is found, the reference point B7 is reached. In the step 109, the motor controller switches to the reverse motion direction (upstream). The letter A is transported back only a short distance because the transgression of the criterion Z>2 is recognized in the step 108 and a branch is made to a step 115, stop motor. However, the letter A is still moved somewhat backwards even in the stop event, so that it comes to rest lying completely on the weighing pan 6. A semi-dynamic weighing is implemented with a motion reduced to zero. First, however, the loop counter is incremented to the value Z=Z+1=4 in the step 110 and the reference point B1 is subsequently reached. After the incrementation in the step 110, the steps 102, 103a, 103c and 103d are executed and a difference formation is undertaken in the step 104 when all measured values M1 through Mi with i>14 are stored, the number of which having been prescribed by the parameter P3. Especially large and heavy pieces of mail have long transient behavior. In the third operating mode, the number of measured values M1 through Mx in the static re-measurement is thus greater than fourteen.

The switching to the forward motion direction (downstream) that may have been undertaken in the step 109 remains without effect if the microprocessor 21 finds in the following step 108 that the loop count Z>2 of the round counter is exceeded and the motor was shut off in the step 115, incrementation to the value Z=4 is undertaken in the step 110 and a check is carried out later in the step 105 whether the time condition is met (time out). The measurement ends after stop 112 with a plausible result or with an implausible result given stop 116.

Figure 5:
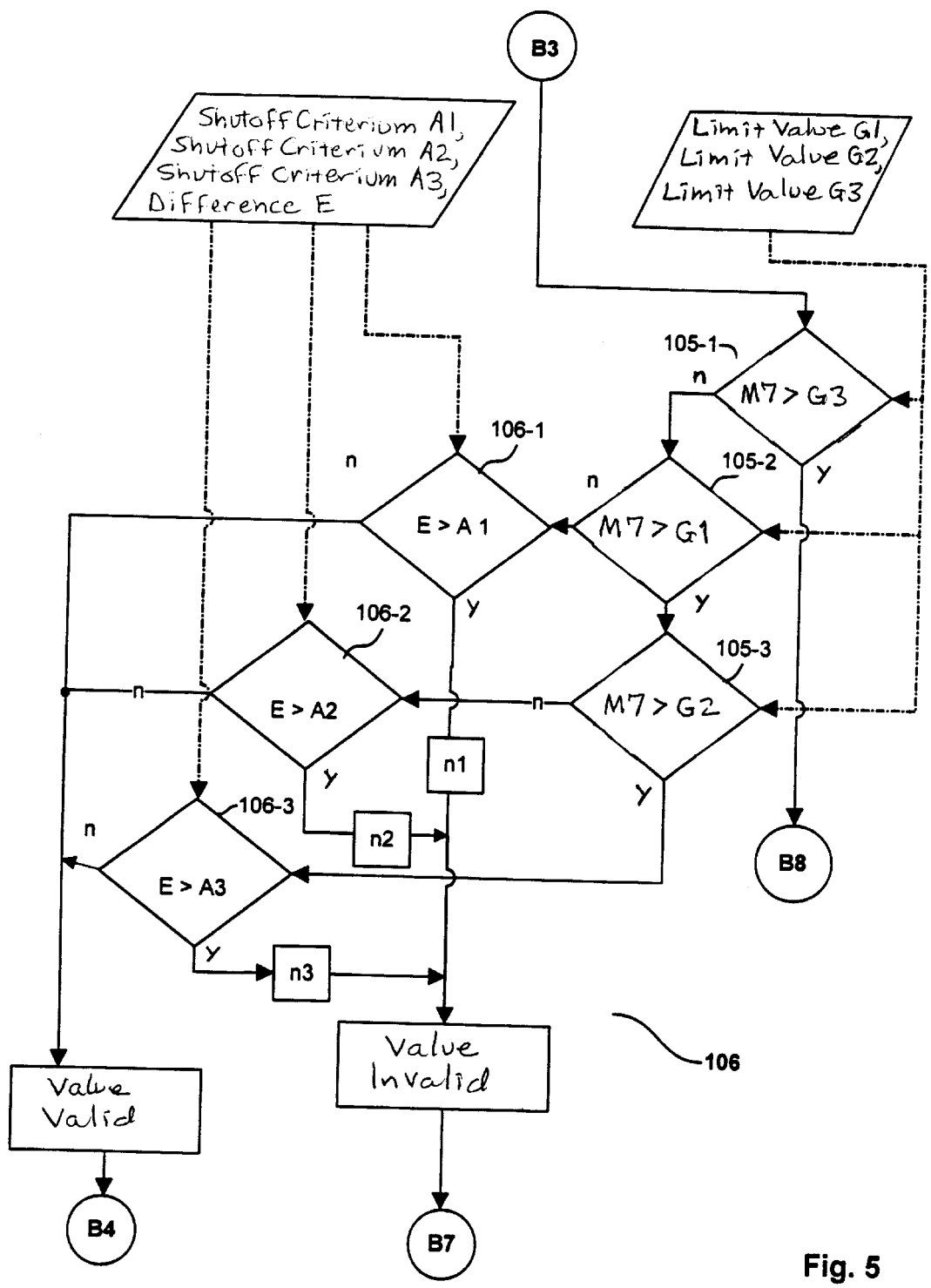
FIG. 5 is a sub-flowchart for overload and shutoff criterion in the dynamic scale constructed and operating in accordance with the invention.

FIG. 5 shows the sub-flowchart for overload and shutoff criterion. In the query steps 105-1, 105-2, 105-3, the seventh measured value is compared to respective limit values G3, G1 and G2. The weight class to which the measured values can be assigned can be determined in this way. If the seventh measured value M7 is greater than the third limit value G3, then an overload is found and the reference point B8 is reached. Otherwise, M7<G3 applies and a check is carried out to see whether the seventh measured value is greater than the first limit value G1. When this is the case, i.e. G1<M7<G3 is present, then a check is made to determine whether the seventh measured value is greater than the second limit value G2. When this is the case, i.e. G1<G2<M7<G3, then a branch is made onto the query step 106-3. From query step 106-3, E cannot be greater than the third query criterion A3 if the acquired measured values are to be valid. Otherwise, a branch is made from the query step 105-2, 105-3 to the query step 106-1, 106-2, respectively. In the query steps 106-1, 106-2, 106-3, the difference E is compared to a value A1, A2 and A3 as shutoff criterion. If the difference E is greater than the shutoff criterion A1, A2 or A3, then the measured values are invalid (reference point B7). The measured values are valid (reference point B4) if the difference E lies within the shutoff criterion A1, A2 or A3. The terms "limit values" and "shutoff criteria" are explained in the aforementioned co-pending application Ser. No. 09/458,000. Given a value of the difference E greater than the shutoff criterion A1, the shutoff criterion is also met in order to prescribe a reference value n1 for the speed regulation of the dc motor 49. The motor 49 is supplied with d.c. pulses, as a result of which a specific speed occurs on the basis of the ratio of the pulse length to the pulse pause, and the conveyor belt is set to a specific speed, which is also retained for a time after the shutoff of the regulation. It is presumed that the measuring arrangement with the weighing cell have already zeroed in on the weight in the first operating mode. However, noise pulses caused, for example, by a striking of the leading edge of the letter against the weighing pan 6 at the admission region of the scale have led to the upward transgression of the shutoff criterion A1. The steady state was achieved with the last measured values. A few measured values M1 through Mx with which the evaluation in the steady state is repeated then suffice for the measurement. The letter A can thus be transported upstream with a second speed that is higher than the first speed.

If the shutoff criterion A2 is met, it is assumed that the measuring arrangement with the weighing cell had not yet entirely zeroed in on the weight in the first operating mode. Since the critical oscillation amplitude acting on the difference value E always lies at the start of the weighing oscillation, it suffices when the measurement is implemented again with the same plurality of measured values M1 through M14 and the evaluation is repeated. When the shutoff criterion A2 is met, then a reference value n2 is thus prescribed for the speed regulation of the dc motor 49. The second speed can thus be equal to the first.

Especially large and heavy letters have long transient responses. If, because of this, the measuring arrangement with the weighing cell was only capable of zeroing in a little on the weight in the first operating mode, the letter A is transported upstream with a second speed that is lower than the first speed. If, as a result of the first measurement, the shutoff criterion A3 is thus met, than a reference value n3 for the speed regulation of the dc motor 49 is prescribed, this lengthening the measuring time. The number of measured values M1 through Mx in the re-measurement is thus greater than fourteen.

Figure 6:
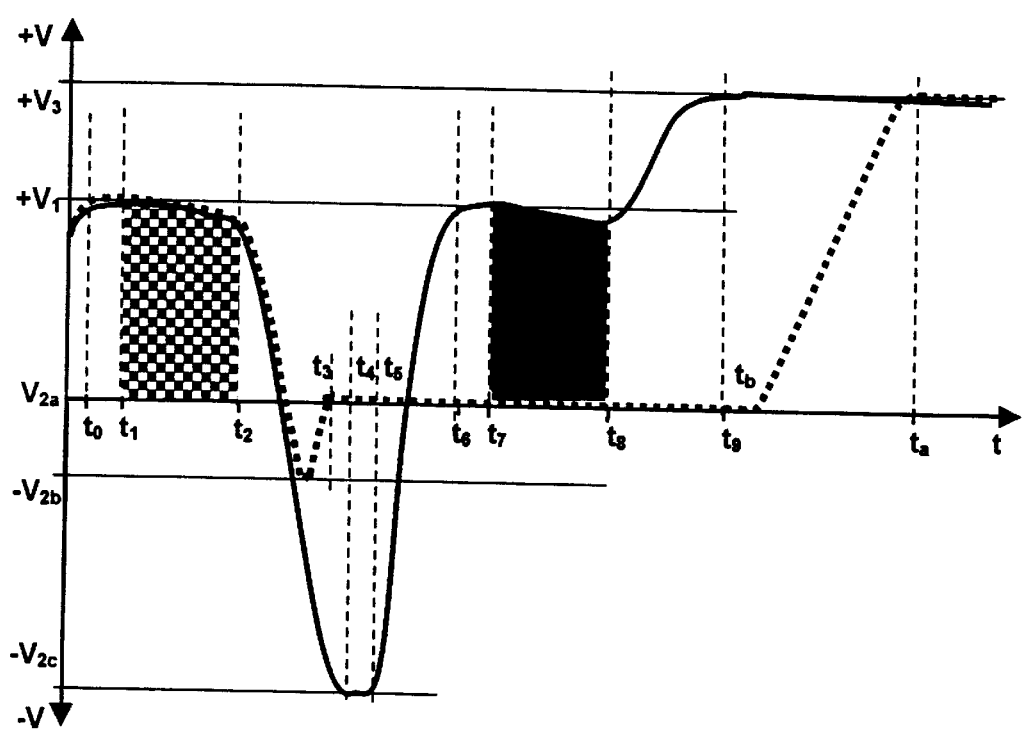
FIG. 6 is a speed/time diagram for the control of the downstream re-weighing in the dynamic scale constructed and operating in accordance with the invention.

FIG. 6 shows a speed/time diagram for the control of the dynamic scale when a re-weighing downstream is required after the weighing. The scale is in the first operating mode when a letter A is supplied at time $t_0$ with a (positive) transport velocity $V_1$. The measurement (checkerboard pattern) begins with time $t_1$ and ends at time $t_2$. At time $t_1$, input jolts on the weighing pan 6 given letter feed usually already have decayed. A re-weighing is required when the input jolts on the weighing pan 6 given letter feed have not yet decayed or not decayed far enough. Such a requirement is recognized in the interpretation of the measured values. It is usually high-mass letters that shoot at least partially beyond the back end of the scale at the letter output 32. The transport velocity $V_1$ is therefore reduced to the velocity $V_{2a}=0$, and the letter A is then transported back upstream (negative velocity), at least until the sensor S2 detects that the leading edge of the letter exits the letter output 32. The transport velocity is then reduced again to the velocity $V_{2a}=0$. The dotted line shown in FIG. 3 shows a static re-weighing beginning with time $t_3$ and ending at time $t_7$. A static re-weighing in the second operating mode is described in the aforementioned co-pending application Ser. No. 09/458,000.

A renewed dynamic re-weighing can ensue in a second operating mode when the letter A was transported back upstream to the admission region with a second (negative) speed and the letter has assumed a predetermined position from which an adequate distance extends downstream in the direction of the next processing device in order to dependably repeat a weight determination of the letter A in the dynamic mode of the scale/conveyor system. After recognizing the letter position on the basis of the letter edge of the letter A, the sensor S1 forwards a corresponding signal to the control 20, which causes the motor 49 to be driven with the opposite rotational sense and the transport device again transports the letter A downstream across the scale for re-weighing with a third (positive) speed. The third speed is shown in FIG. 3 as being equal to the first speed. In another embodiment the controller 20 implements the re-measurement with a higher speed dependent on the extent to which the measuring arrangement with the weighing cell has already zeroed in on the weight of the piece of mail in the first operating mode.

The scale is composed of the principal components of the transport device 4, the weighing pan 6, the weighing cell 7 as well as the electronic control unit 20, which includes an evaluation unit. The transport path, which is limited by a letter admission region and a letter output 32 at which a letter A is detected respectfully by sensors S1 and S2 proceeds on the weighing pan 6. In the measurement, the letter A cannot lie only partly at the letter admission or letter output 32, i.e. outside the weighing pan 6. The microprocessor 21 is programmed in order to receive and interpret signals from sensors S1, S2 and encoder signals. The dimensions of a letter A or a letter jam can be indirectly determined therefrom. Given an identical weight, a large-format letter may be weighed at a lower transport speed than a small-format letter for which a longer effective transport path is available. For this purpose, the microprocessor 21 is programmed for the determination of the effective transport path for a weight measurement. Dependent on the effective transport path for a weight measurement, the velocity $V_2'$ is varied, with $V_{2a} < V_2' < V_{2c}$. Given variation of a velocity $V_2'$, the microprocessor 21 can access an appropriate, further parameter set for the measured value interpretation. Instead of the microprocessor 21, microcontrollers or application-specific circuit (ASICs) can be utilized for the control of the scale.

Via the interface 25, data are transmitted from a postage meter machine (not shown) to the dynamic scale and, vice versa, the valid weight value determined in the scale is transmitted to the postage meter machine. When, for example, the user interface of the postage meter machine is co-employed for the adaptation of the controller of the dynamic scale, then a separate user interface for the scale can be omitted. The setting of selected shipping parameters for a postage calculation in the postage meter machine and/or of operating parameters for the scale ensues according to the respective demands made of the processing of a mixed mail stack.

The clock rate for the postal matter passing through a postage meter machine (in pieces per hour) is highest at the postage meter machine. The maximum letter transport velocity $V_3$ of the scale is automatically matched to that of the postage meter machine. For the re-weighing implemented in the second operating mode, a predetermined postal matter transport velocity is preset dependent on the result of the measured value interpretation implemented in the first operating mode in the initial weighing, and an appertaining parameter set is offered for the evaluation, this enabling an efficient mixed mail processing.

The communication between an automatic feeder, dynamic scale and the postage meter machine can, for example, sequence as disclosed in German Patent Application 197 11 991.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for controlling a dynamic scale, comprising the steps of:

moving an item to be weighed on a controllable transport device to transport said item to a weighing cell disposed between an entry region and an exit region, said controllable transport device being operable for transporting said item in a downstream direction, from said entry region to said exit region, and in an opposite upstream direction in a plurality of different operating modes;

at said weighing cell, weighing said item to obtain at least one measured weight value;

interpreting said at least one measured weight value to obtain an interpretation result; and dependent on said interpretation result, changing the operating mode of the transport device from transporting said item downstream to transporting said item upstream for, re-weighing said item at said weighing cell.

2. A method as claimed in claim 1 wherein the step of identifying the accuracy of said at least one measured weight result comprises comparing a difference between a maximum and a minimum of all of said measured weight values to at least one predetermined criterion, and determining that said item has been inaccurately weighed if said predetermined criterion is transgressed.

3. A dynamic scale comprising:

a transport path for an item to be weighed, said transport path having an entry region and an exit region for said item;

a weighing cell disposed in said transport path;

a controllable transport device for transporting said item to and from said weighing cell along said transport path, said transport device being operable to transport said item in a downstream direction away from said entry region and toward said exit region, and in an opposite upstream direction, said transport device having a controllable drive; and a control unit connected to said weighing cell and to said drive for interpreting said measured weight result and for changing an operating mode of said drive, from among a plurality of different operating modes, dependent on the interpretation of the measured weight result, including at least one operating mode wherein the transport device transports said item upstream for re-weighing said item at said weighing cell.

4. A dynamic scale as claimed in claim 3 further comprising:

a first sensor and a second sensor disposed in said transport path for detecting a position of said item in said transport path and for respectively supplying signals to said control unit when said transport device changes direction between said upstream and downstream directions;

wherein said control unit comprises a microprocessor, and a program memory and a non-volatile memory connected to said microprocessor; and said program memory containing a program for operating said microprocessor to control said drive of said transport device to transport said item downstream to said weighing cell at a first speed, stored in said non-volatile memory, for conducting a weight measurement of said item at said weighing cell and for interpreting said measured weight result as to plausibility and for, given an implausibility of said measured weight result, for operating said drive of said transport device to transport said item upstream at a second speed, stored in said non-volatile memory, and for conducting a re-weighing of said item at said weighing cell.

5. A dynamic scale as claimed in claim 4 wherein said program memory further controls said microprocessor to operate said drive of said transport device to transport said item upstream to a predetermined position along said transport path at said second speed and for operating said drive of said transport device to thereafter transport said item downstream, after said re-weighing, at a third speed which is stored in said non-volatile memory.

6. A dynamic scale as claimed in claim 4 wherein said program and said program memory operates said microprocessor to interpret said measured weight result for plausibility of implausibility by identifying an accuracy of said measured weight result, and for selecting a magnitude of said second speed dependent on said accuracy.

7. A dynamic scale as claimed in claim 3 further comprising sensors disposed in said transport path and connected to said control unit for supplying respective signals to said control unit identifying a position of said item along said transport path.

8. A dynamic scale as claimed in claim 3 wherein said drive of said transport device comprises a direction-switchable motor with controllable speed, and wherein said control unit, upon changing the operating mode of the transport device, changes at least one of said direction and said speed of said motor.

9. A dynamic scale as claimed in claim 8 further comprising a driver stage connected between said control unit and said motor.

10. A dynamic scale as claimed in claim 3 wherein said drive of said transport device comprises a d.c. motor with controllable speed, and wherein said control unit, for changing the operating mode of the transport device, changes the speed of said motor.

11. A dynamic scale as claimed in claim 10 further comprising a driver stage connected between said control unit and said motor.

12. A dynamic scale as claimed in claim 3 further comprising a plurality of sensors disposed along said transport path and connected to said control unit for supplying respective signals thereto identifying a position of said item along said transport path, and wherein said control unit determines a path of travel of said item along said transport path from said sensor signals which is effective for weighing said item at said weighing cell.

13. A dynamic scale as claimed in claim 12 wherein said drive of said transport unit is operable with a variable speed, and wherein said control unit varies said speed of said transport device dependent on the determination of said path of travel.

14. A dynamic scale as claimed in claim 13 wherein said control unit includes a memory containing a plurality of parameter sets for different speeds of said drive, and wherein said control unit accesses said memory to obtain the parameter set which corresponds to the speed which said control unit sets for said drive dependent on said path of travel.

15. A method for controlling a dynamic scale, comprising the steps of:
moving an item to be weighed on a controllable transport device to transport said item to a weighing cell disposed between an entry region and an exit region, said controllable transport device being operable for transporting said item in a downstream direction, from said entry region to said exit region, and in an opposite upstream direction in a plurality of different operating modes;
at said weighing cell, weighing said item to obtain at least one measured weight value;
interpreting said at least one measured weight value to obtain an interpretation result; and
dependent on said interpretation result, changing the operating mode of the transport device from transporting said item downstream to transporting said item upstream and re-weighing said item, stopping said item at a predetermined position on said transport device, and again changing the mode of the transport device and transporting said item downstream and again re-weighing said item.

16. A method for controlling a dynamic scale, comprising the steps of:
moving an item to be weighed on a controllable transport device to transport said item to a weighing cell disposed between an entry region and an exit region, said controllable transport device being operable for transporting said item in a downstream direction, from said entry region to said exit region, and in an opposite upstream direction in a plurality of different operating modes;
at said weighing cell, weighing said item to obtain at least one measured weight value;
interpreting said at least one measured weight value to obtain an interpretation result; and
dependent on said interpretation result, changing the operating mode of the transport device from transporting said item downstream transporting said item upstream and stopping said item at a predetermined position on said transport device and re-weighing said item, and again changing the operating mode of said transport device to transport said item downstream after re-weighing said item.

17. A method for controlling a dynamic scale, comprising the steps of:
moving an item to be weighed on a controllable transport device to transport said item to a weighing cell disposed between an entry region and an exist region, said controllable transport device being operable to transporting said item in a downstream direction, from said entry region to said exit region, and in an opposite upstream direction in a plurality of different operating modes;
at said weighing cell, weighing said item to obtain at least one measured weight value;
interpreting said at least one measured weight value to identify an accuracy of said at least one measured weight value; and
dependent on said accuracy, changing the operating mode of the transport device from a first operating mode at a first speed to transport said item from said entry region to said weighing cell for obtaining said at least one measured weight result, to a second operating mode to transport said item upstream at a second speed to a predetermined position at said transport device, and to a third operating mode to transport said item downstream from said predetermined position to said exit region at a third speed, and said second speed being equal to said first speed and lower than said third speed.

18. A method for controlling a dynamic scale, comprising the steps of:

moving an item to be weighed on a controllable transport device to transport said item to a weighing cell disposed between an entry region and an exist region, said controllable transport device being operable to transporting said item in a downstream direction, from said entry region to said exit region, and in an opposite upstream direction in a plurality of different operating modes;

at said weighing cell, weighing said item to obtain at least one measured weight value;

interpreting said at least one measured weight value to identify an accuracy of said at least one measured weight value; and dependent on said accuracy, changing the operating mode of the transport device from a first operating mode at a first speed to transport said item from said entry region to said weighing cell for obtaining said at least one measured weight result, to a second operating mode to transport said item upstream at a second speed to a predetermined position at said transport device, and to a third operating mode to transport said item downstream from said predetermined position to said exit region at a third speed, and said second speed being different from said first speed and lower than said third speed.

* * * * *